(No Model.)
L. STEVENSON & W. B. JACOBS.
WHIFFLETREE ATTACHMENT.
No. 278,288. Patented May 22, 1883.
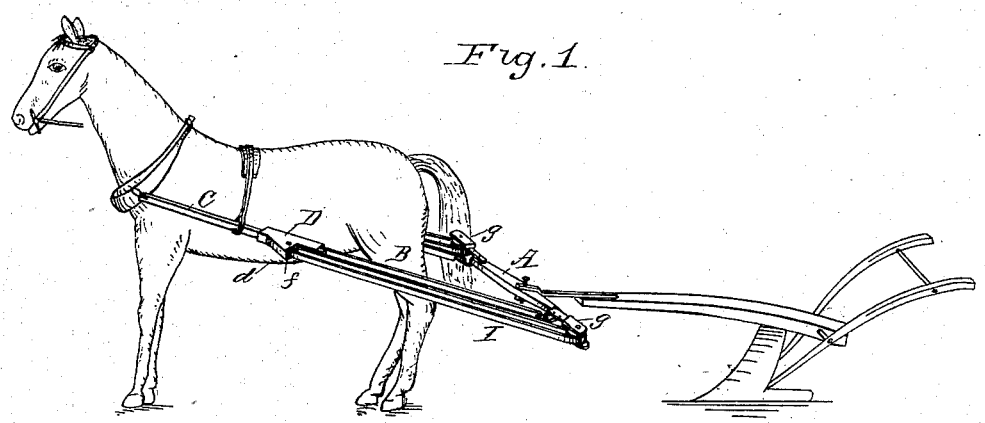
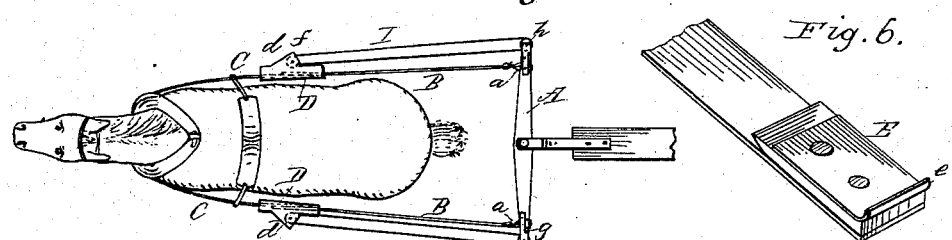
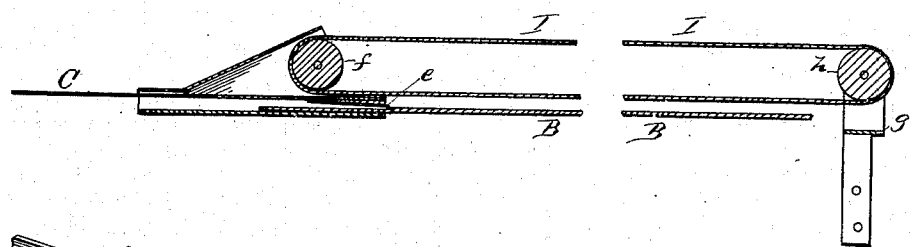
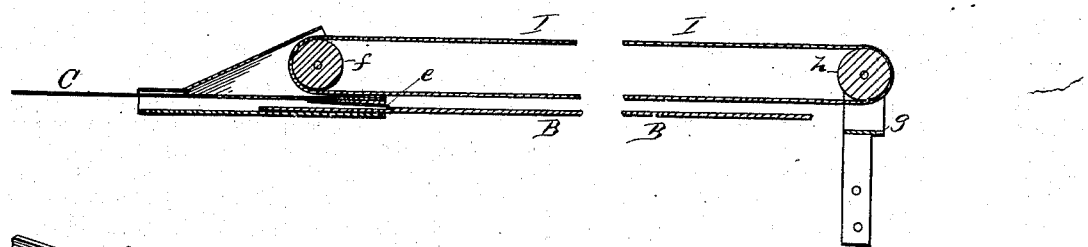
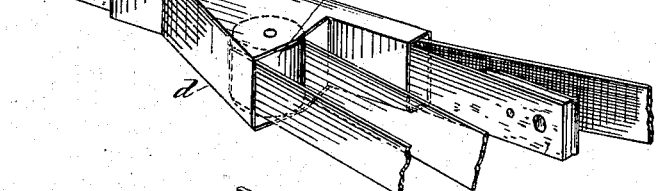
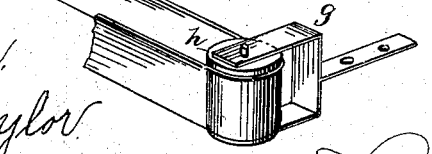

United States Patent Office.

LEONARD STEVENSON, OF SOLON, AND WILLIAM B. JACOBS, OF TRAVERSE CITY, MICHIGAN.

WHIFFLETREE ATTACHMENT.

SPECIFICATION forming part of Letters Patent No. 278,258, dated May 22, 1883.

Application filed March 1, 1883. (No model.)

*To all whom it may concern:*

Be it known that we, LEONARD STEVENSON and WILLIAM B. JACOBS, citizens of the United States of America, residing at Solon, in the county of Leelenaw, and at Traverse City, county of Grand Traverse, respectively, in the State of Michigan, have invented certain new and useful Improvements in Attachments for Whiffletrees; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to means for protecting the bark of orchard trees from abrasion by the ends of whiffletrees used on plows and other implements employed in cultivating the ground.

It is well known that even the most careful drivers are liable to allow their whiffletrees to come in contact with the trees when cultivating an orchard, and a very great injury frequently results to fruit trees from this cause.

With a view to preventing such injury our invention consists in a novel attachment for trace-tugs and whiffletrees, which will be hereinafter particularly described, and pointed out in the claims.

In the accompanying drawings, Figure 1 is a view of a horse hitched to a plow by means of a whiffletree and tugs provided with our improvements. Fig. 2 is a top view. Fig. 3 is a longitudinal section, illustrating our improvement. Fig. 4 is a perspective view, illustrating the connection of the belt with the tug. Fig. 5 is a perspective view of the pulley by which the belt is attached to the whiffletree, showing also a portion of the belt. Fig. 6 is a perspective view of the clutch for connecting the front to the rear portion of the tug.

The letter A designates the whiffletree, having hooks *a* at its ends for attaching the trace-tugs in the usual manner. B is the rear portion and C the front portion of the trace-tug, the front portion being attached to the harness in the usual manner and extended rearward through a narrow box, D, into which also extends the front end of the rear portion. The rear end of the front portion has attached to it a metallic plate, E, bent at its rear end to form a hook, *e*, which projects toward the rear portion of the tug, and is of such extent that it will bind said rear portion against the inner wall of the box D when the rear end of said portion is drawn into said box. A convenient adjustable connection is thus made between the two portions of the trace-tug, and by the same means the adjustment of the box D is effected for the purpose which will be presently explained. From the outer side of the box D projects a casing, *d*, between the upper and lower walls of which is pivoted a pulley, *f*, and to the end of the whiffletree is secured a bracket, *g*, in which is mounted a pulley, *h*. Around the pulleys *f* and *h* is passed a belt, I, each end of the whiffletree and each of the tugs being connected by belts in the same manner.

In hitching up the horse the box D is moved forward until the belt I is tightened, the rear end of the front portion of the tug being first drawn slightly rearward out of the box. After the belt is tightened the front portion of the tug B is correspondingly tightened and inserted into the box, and the front portion, C, is then drawn inward, so that the hook *e* will bind the rear portion of the tug. The two end attachments being thus adjusted, the hitching up is complete.

It will now be observed that if the belt I comes in contact with a tree it will be moved longitudinally on its pulleys and will not deleteriously rub the bark, and as the plow progresses the moving belt will guard the tree from abrasion by the end of the whiffletree.

Having now fully described our invention, we wish it to be understood that we do not confine ourselves to any particular construction of the tug proper, as it is obvious that a pulley may be connected with any ordinary tug or trace-chain for supporting the forward portion of a belt passing rearwardly around a pulley on a whiffletree. Nor do we confine ourselves to any of the precise details shown in our drawings, but reserve to ourselves the right to vary the same in any desired manner without departing from the essential principle of our invention.

What we claim is—

1. The herein-described attachment for a tug and a whiffletree, consisting of a pulley mounted in suitable bearings adapted for attachment to a trace-tug, a pulley mounted in suitable bearings adapted for attachment to the end of a whiffletree, and a belt arranged to connect said pulleys, substantially as and for the purpose set forth.

2. The combination, with a whiffletree and trace-tug, of a pulley mounted at the end of the whiffletree, a pulley mounted intermediately on the trace-tug, and an endless belt connecting said pulley, substantially as described.

3. The combination, with the whiffletree A, bracket $g$, and pulley $h$, of the tug B, adjustable box D, having casing $d$ projecting therefrom, the pulley $f$, mounted in said casing, and the belt I, passing around both of said pulleys, substantially as described.

4. The combination, with the whiffletree A, having pulley $h$ mounted thereon, the box D, having the pulley $f$ supported thereby, and the belt I, connecting said pulleys, of the tug composed of the forward portion, C, passed rearwardly through said box, and provided with clutch-plate E, and the rear portion, B, having its forward end arranged for insertion into said box for engagement by said clutch-plate, substantially as described.

In testimony whereof we affix our signatures in presence of two witnesses.

LEONARD STEVENSON.
WILLIAM B. JACOBS.

Witnesses:
SETH E. MOFFATT,
LORIN ROBERTS.